(12) United States Patent
Chen (10) Patent No.: US 9,740,021 B1
(45) Date of Patent: Aug. 22, 2017

(54) GLASSES WITH LENS FASTENED BY PIVOTAL MEMBERS

(71) Applicant: Lin Yun Chen, Tainan (TW)

(72) Inventor: Lin Yun Chen, Tainan (TW)

( * ) Notice: Subject to any disclaimer, the term of this patent is extended or adjusted under 35 U.S.C. 154(b) by 0 days.

(21) Appl. No.: 15/213,324

(22) Filed: Jul. 18, 2016

(51) Int. Cl.
*G02C 1/04* (2006.01)
*G02C 7/02* (2006.01)

(52) U.S. Cl.
CPC .............. *G02C 1/04* (2013.01); *G02C 7/02* (2013.01); *G02C 2200/08* (2013.01)

(58) Field of Classification Search
CPC .... G02C 2200/06; G02C 5/2209; G02C 1/04; G02C 2200/18; G02C 7/088
USPC .......... 351/106, 86, 103, 83, 90, 92, 110, 41
See application file for complete search history.

(56) References Cited

U.S. PATENT DOCUMENTS

| | | | |
|---|---|---|---|
| 7,222,958 B1 * | 5/2007 | Chiou | G02C 1/04 351/103 |
| 8,668,330 B2 * | 3/2014 | Reyes | A61F 9/025 351/106 |
| 9,004,679 B2 * | 4/2015 | Chen | G02C 1/04 351/103 |

* cited by examiner

*Primary Examiner* — Hung Dang
(74) *Attorney, Agent, or Firm* — Bruce Stone LLP; Joseph Bruce (57) ABSTRACT

A pair of glasses includes a spectacles frame, a lens unit, and two pivotal members. A pivot hole is provided in each of first and second ends of the spectacles frame. The lens unit is detachably assembled on the spectacles frame and includes two snap-fit portions. Each pivotal member includes a swing arm and a pivot formed at the swing arm and held in a corresponding pivot hole, so that each pivotal member can make a pivotal rotation relative to the spectacles frame. The swing arm includes a locating slot at a lower end thereof. The lens unit is assembled on the spectacles frame when the snap-fit portions of the lens unit join the locating slots in the pivotal members. The lens unit can be disassembled from the spectacles frame when the snap-fit portions of the lens unit are separated from the locating slots in the pivotal members.

9 Claims, 7 Drawing Sheets

GLASSES WITH LENS FASTENED BY PIVOTAL MEMBERS

BACKGROUND OF THE INVENTION

1. Field of the Invention

The present invention relates to a pair of glasses and, more particularly, to a pair of glasses with a lens replaceable conveniently.

2. Description of the Related Art

In the era of material life promoted, people with novelty aspiration are fastidious about portable decorative objects. For example, sunglasses or leisure eyeglasses are popularized among persons who value the glasses aesthetically matching costumes. In this regard, a user who prefers versatile fancy sunglasses or leisure eyeglasses may change lenses in a pair of glasses frequently to match his/her mood or costumes but finally buy a new pair of glasses without cost effectiveness because lenses of the glasses are difficultly replaced.

In general, a pair of conventional glasses includes a spectacles frame, two lenses, and two temples pivotally fitted at both sides of the spectacles frame. The spectacles frame includes two lens grooves opened in an inner edge thereof in which the lenses are held. During installation of each lens, the lens should be forcibly embedded into one of the lens grooves according to elasticity of the spectacle frame in general. However, either a lens which is fragile usually or a spectacle frame could be damaged in an assembly/disassembly process.

There have been multiple conventional techniques for a pair of glasses which feature lenses replaceable conveniently and neither lenses nor a spectacle frame damaged. However, a removable lens uneasily or incorrectly fixed on a spectacles frame might be positioned with an auxiliary magnetic component which complicates structure of a pair of glasses.

BRIEF SUMMARY OF THE INVENTION

Thus, an objective of the present invention is to provide a pair of glasses on which a replaceable lens is fastened with pivotal members for simplified structure and lenses conveniently replaced To achieve this and other objectives, a pair of glasses of the present invention includes a spectacles frame, a lens unit, and two pivotal members. The spectacles frame includes a first end, a second end, and a central portion between the first and second ends. A mounting adapter is formed at each of the first and second ends and includes a pivot hole. The lens unit is detachably assembled on the spectacles frame and includes two snap-fit portions. Each pivotal member includes a swing arm and a pivot provided at an upper end of the swing arm and held in the pivot hole in a corresponding mounting adapter to define an axis by which each of the pivotal members can make a pivotal rotation relative to the spectacles frame. An engaging body is formed at a lower end of the swing arm and includes a locating slot which can be engaged with or separated from one of the two snap-fit portions of the lens unit. The lens unit is fixed on the spectacles frame when the two snap-fit portions are engaged with the two locating slots of the two pivotal members. The lens unit can be disassembled from the spectacles frame when the two snap-fit portions are separated from the two locating slots of the two pivotal members.

In a preferred form, the lens unit includes a lens having a top and two lateral outer borders. The pivot hole is located near an internal end of the mounting adapter. Each of the outer borders is partially held in the internal end of the mounting adapter, and each of the two snap-fit portions is designed at a lower portion of one of the two outer borders of the lens. Two notches are opened in the lower portion of each outer border of the lens and indent from an edge of the outer border to define the snap-fit portion between the two notches. The engaging body includes two spaced chuck walls, an upper interconnecting portion bridging upper ends of the chuck walls, and a lower interconnecting portion bridging lower ends of the chuck walls. The locating slot is defined between the two chuck walls. The upper and lower interconnecting portions of each pivotal member are held in the two notches of the lens, respectively.

In another preferred form, the lens unit includes two lenses, and the spectacles frame is provided with a nose pad portion formed at a lower end of the central portion and including two lens support grooves. Each of the two lens support grooves is developed between the internal end of one of the mounting adapters and the nose pad portion along a bottom of the spectacles frame. Each of the lenses has an outer border and a top held in and engaged with a corresponding lens support groove of the spectacles frame. The two snap-fit portions are respectively designed at a lower portion of the outer border of the two lenses. Two spaced notches are opened in the lower portion of the outer border of each lens and indent from a edge of the outer border to define the snap-fit portion between the two notches. The engaging body includes two spaced chuck walls, an upper interconnecting portion bridging upper ends of the chuck walls, and a lower interconnecting portion bridging lower ends of the chuck walls. The locating slot is defined between the two chuck walls. The upper and lower interconnecting portions of each pivotal member are held in the notches of a corresponding lens, respectively.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

DETAILED DESCRIPTION OF THE INVENTION

A pair of glasses 10 according to the preferred teachings of the present invention is shown in FIGS. 1 through 6 of the drawings and includes a spectacles frame 12, a lens unit 14, two temples 16, and two pivotal members 18. The glasses 10 may be a pair of sunglasses, leisure eyeglasses, sports eyeglasses, protective goggles, nearsighted eyeglasses, farsighted spectacles, presbyopic glasses, etc. The temples 16 can be in the form of straps.

The spectacles frame 12 includes a first end 20, a second end 22 spaced from the first end 20 in a longitudinal direction, a central portion 24 between the first and second ends 20 and 22, and a lens support groove 26 in the bottom thereof for installation of the lens unit 14. A mounting adapter 28 is formed at a lower end of each of the first and second ends 20 and 22 and includes an internal end 30 facing the central portion 24. Two end of the lens support groove 26 are respectively extended to the internal ends 30 of the mounting adapters 28 along the bottom of the spectacles frame 12. A pivot hole 32 is provided in each of the mounting adapters 28 and near the internal end 30 of the mounting adapter 28. A slot 34 is formed in the internal end 30 of each mounting adapter 28 and in communication with a corresponding pivot hole 32. In this embodiment, each of the mounting adapters 28 is provided with a raised engaging lug 36 in an external end thereof, and each temple 16 is pivotally connected to the engaging lug 36 of one of the mounting adapters 28. In this embodiment, each of the temples 16 includes a recess 40 in a front end 38 thereof in which the engaging lug 36 of one of the mounting adapters 28 is held, and a connecting pin 42 penetrates the front end 38 of the temple 16 and the engaging lug 36 to join the temple 16 and the spectacles frame 12, so that the temple 16 can make a pivotal rotation relative to the spectacles frame 12 according to an axis defined by the connecting pin 42.

The lens unit 14 is detachably assembled on the spectacles frame 12 and includes one or two lenses. In this embodiment, the lens unit 14 includes a lens 44 covering a user's both eyes. The lens 44 includes a top 46 and two lateral outer borders 48 spaced in the longitudinal direction, each of which is partially held in the internal end 30 of a mounting adapter 28. The top 46 is inserted into and join the lens support groove 26 in the spectacles frame 12. Each of the outer borders 48 includes a snap-fit portion 50 at a lower portion thereof. In this embodiment, two notches 52 are opened in the lower portion of each outer border 48 of the lens 44 and indent from the edge of the outer border 48 to define the snap-fit portion 50 between the two notches 52. Furthermore, a caulking groove 54 is prepared in an upper end of the top 46 of the lens 44 and joins a lower end of the central portion 24 of the spectacles frame 12 on which the lens unit 14 is assembled.

Each of the pivotal members 18 includes a swing arm 56, and a pivot 58 is provided at an upper end of the swing arm 56 and held in and engages with the pivot hole 32 in a corresponding mounting adapter 28 to define an axis by which each of the pivotal members 18 can make a pivotal rotation relative to the spectacles frame 12. A diameter of the pivot 58 is slightly greater than a width of the slot 34, so that the pivot 58 can be forcibly extended through the slot 34 and held in a corresponding pivot hole 32. The pivot 58 includes an enlarged portion 60 at an outer end thereof to prevent the pivot 58 separated from the pivot hole 32. The swing arm 56 is provided with an engaging body 62 formed at a lower end thereof and including two spaced chuck walls 64, an upper interconnecting portion 66 bridging upper ends of the chuck walls 64, and a lower interconnecting portion 68 bridging lower ends of the chuck walls 64. A locating slot 70 is defined between the two chuck walls 64. When the lens unit 14 is assembled and fixed on the spectacles frame 12, each snap-fit portion 50 of the lens 44 is inserted and held in the locating slot 70 of one of the pivotal members 18, and the upper and lower interconnecting portions 66 and 68 of each pivotal member 18 are held in the two notches 52 of the lens 44, respectively. Moreover, when the pivotal member 18 is moved outward (FIG. 6), the engaging body 62 of the pivotal member 18 is separated from a corresponding snap-fit portion 50 of the lens 44, so that the lens unit 14 can be removed from the spectacles frame 12.

The glasses 10 of the present invention features not only simplified structure but also the lens unit 14 replaced easily. Specifically, pivotal members 18 which are moved outward (FIG. 6) can be separated from the lens unit 14 for replacement of the lens 44 of the lens unit 14 from the spectacles frame 12. On the other hand, the lens 44 of the lens unit 14, which is assembled in the lens support groove 26 of the spectacles frame 12 first, can be securely fixed on the spectacles frame 12 with the pivotal members 18 moved inward and with the snap-fit portions 50 of the lens unit 14 joining the locating slots 70 of the pivotal members 18.

Figure 1:
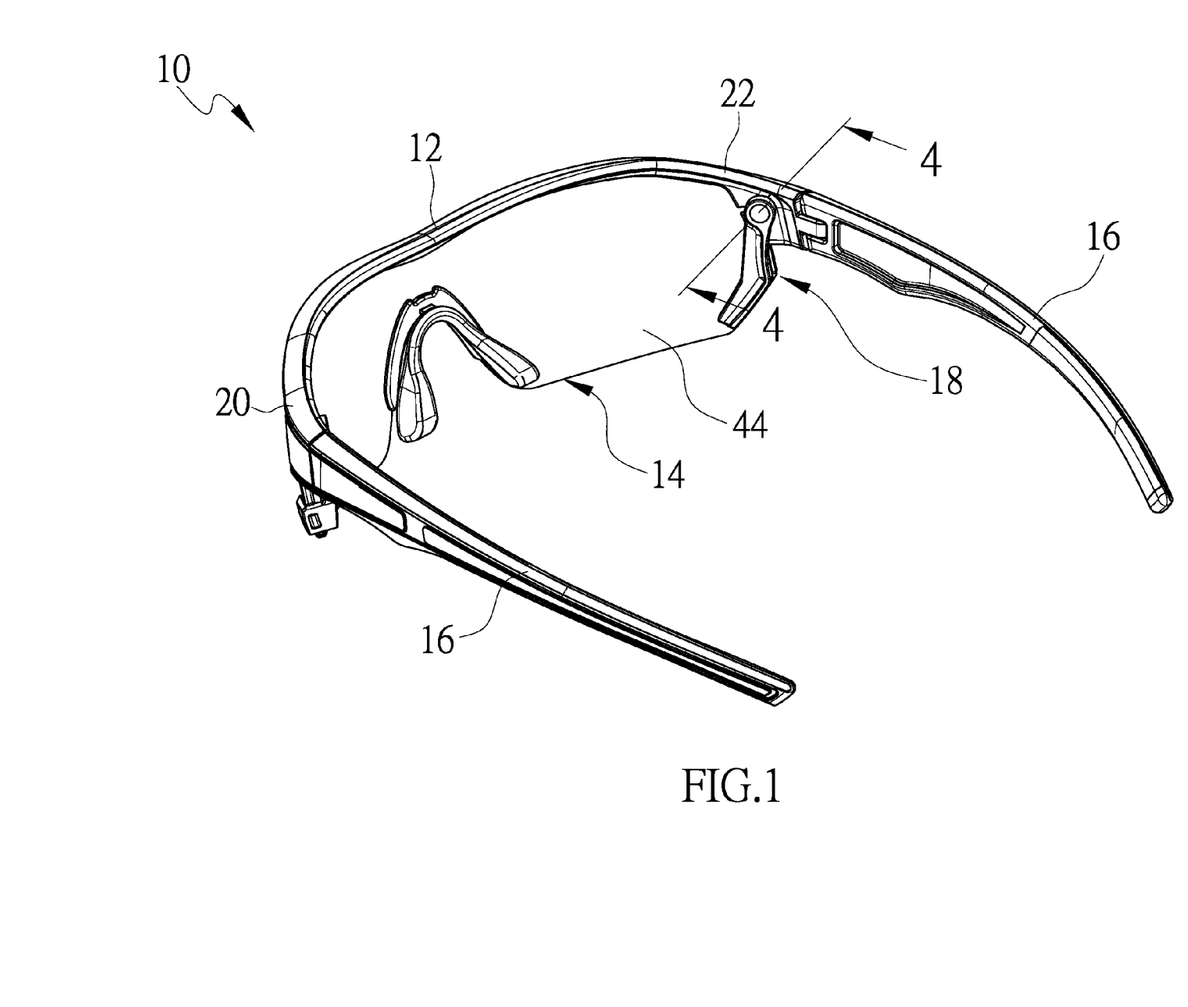
FIG. 1 is a perspective view of a pair of glasses in accordance with an embodiment of the present invention.
Figure 2:
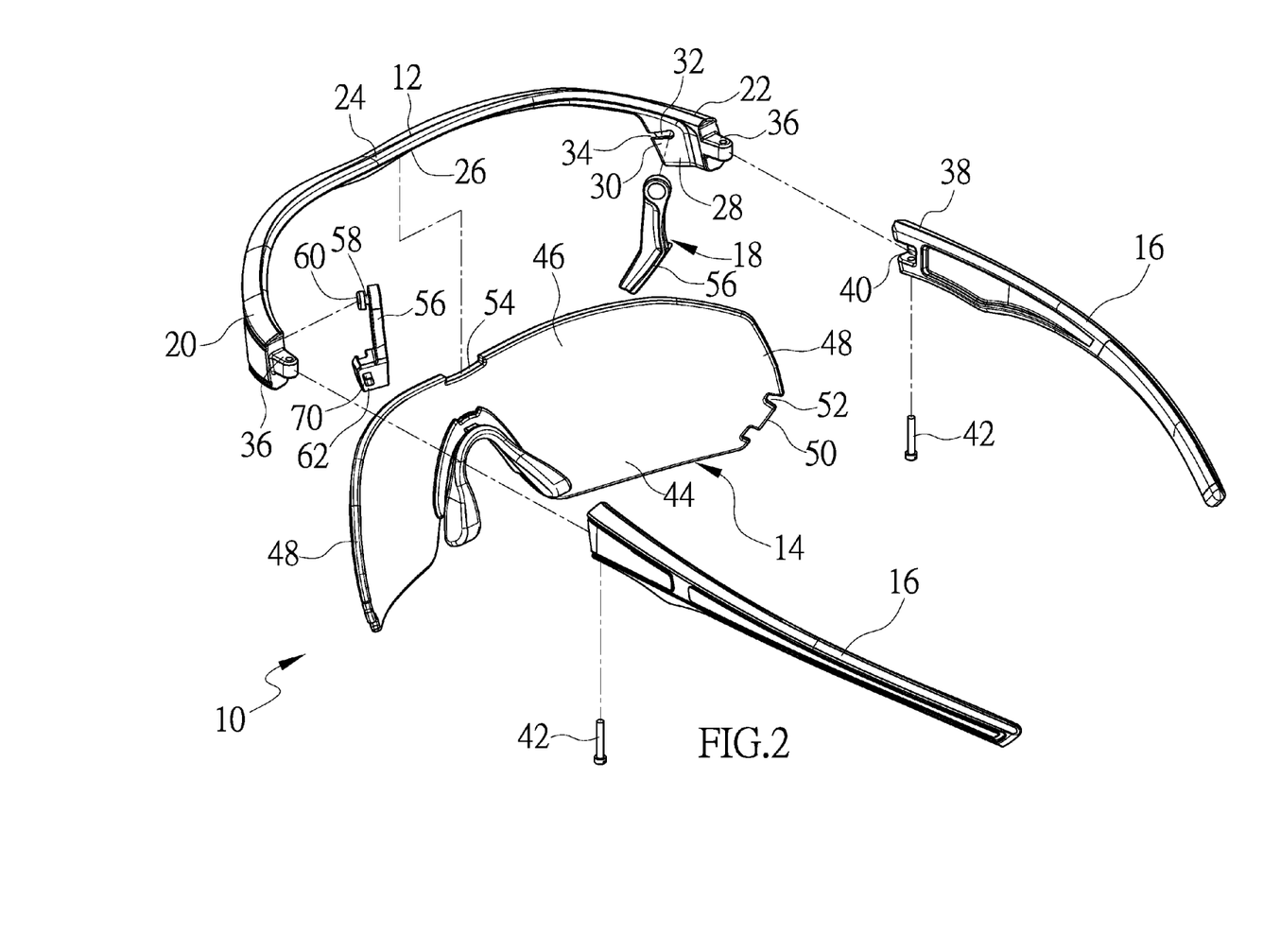
FIG. 2 shows an exploded view of the pair of glasses of FIG. 1.
Figure 3:
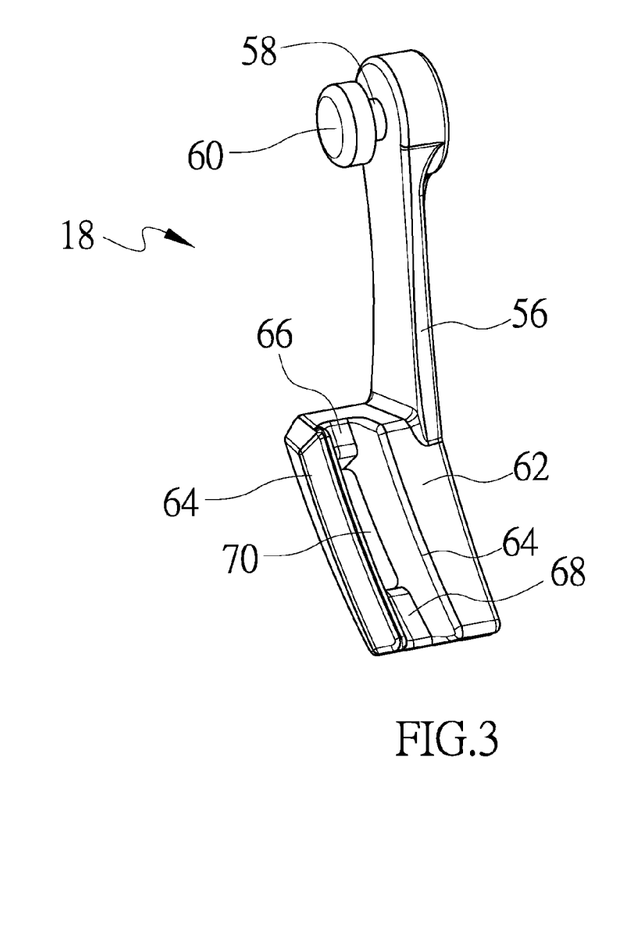
FIG. 3 shows a perspective view of a pivotal member of the pair of glasses of FIG. 1.
Figure 4:
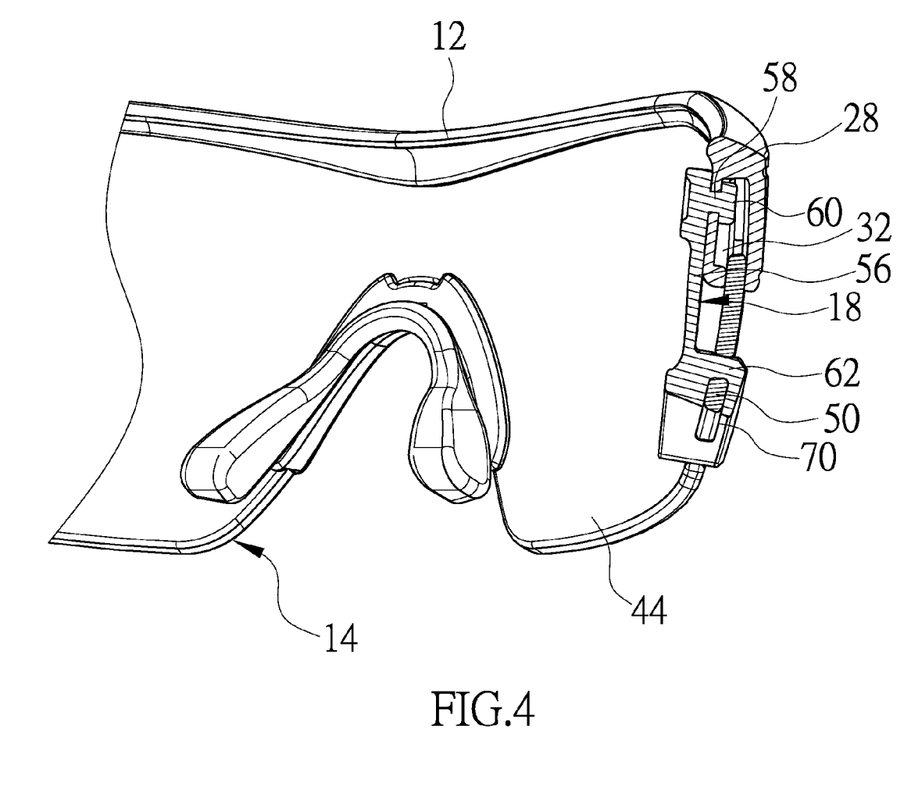
FIG. 4 is sectional view taken along line 4-4 of FIG. 1.
Figure 5:
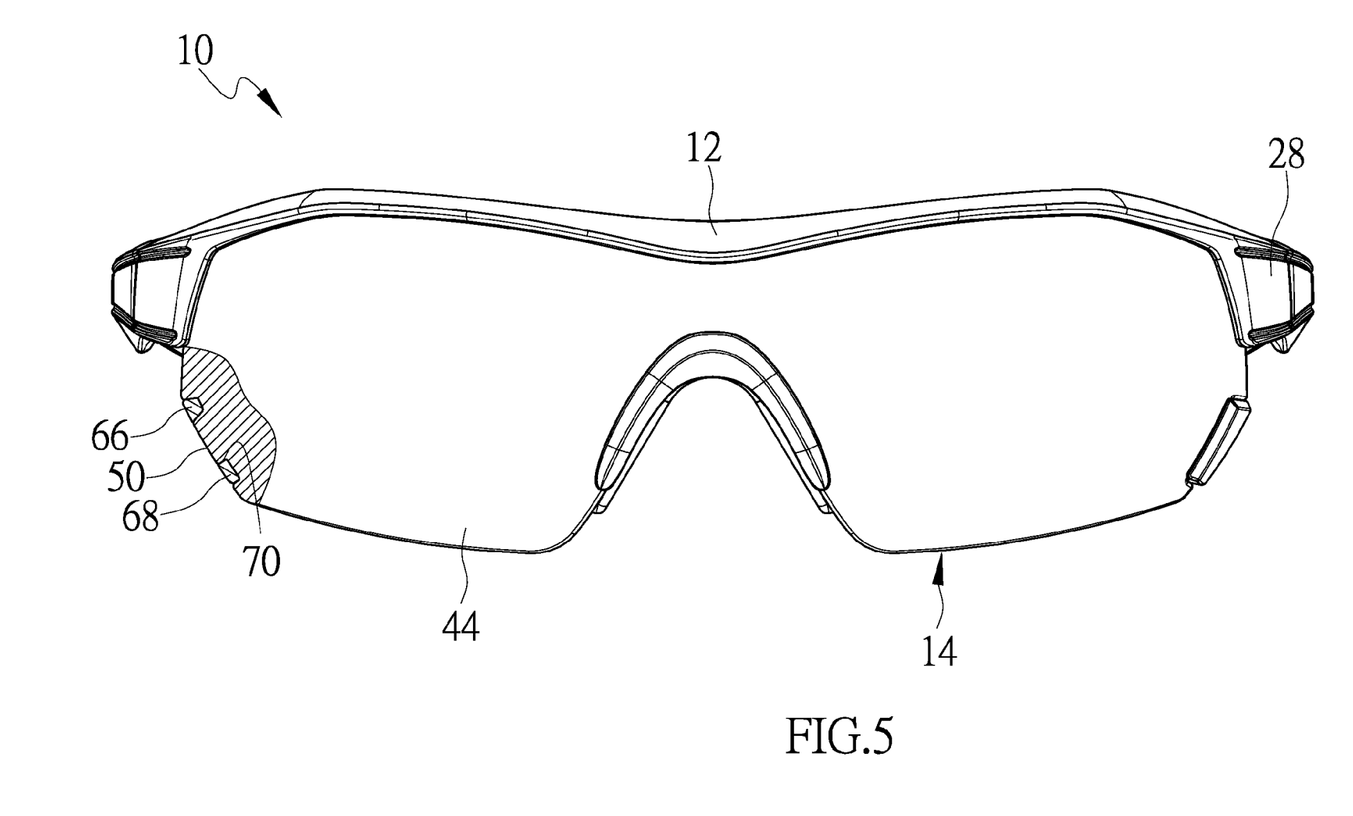
FIG. 5 is a plane view of the pair of glasses in FIG. 1.
Figure 6:
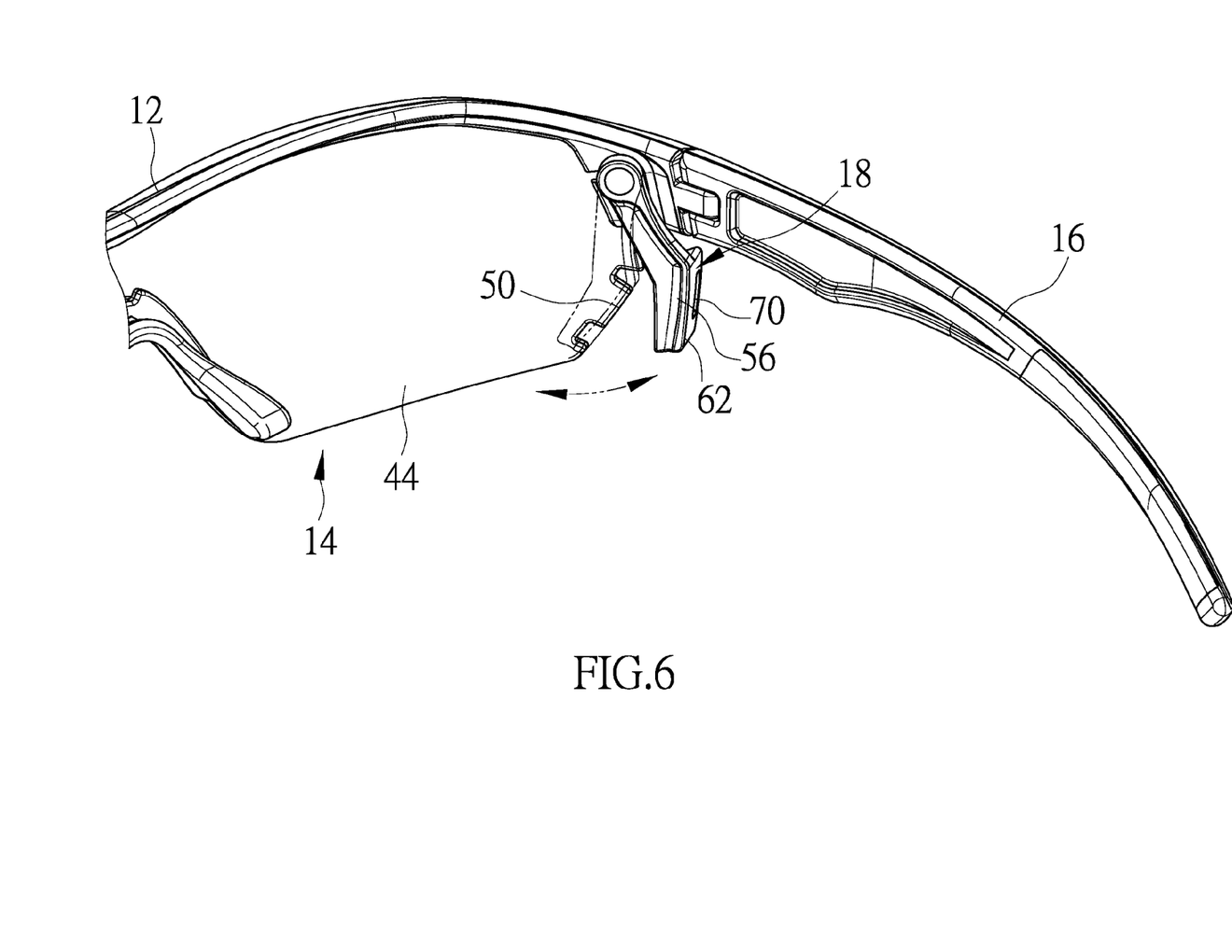
FIG. 6 is a schematic view which illustrates the pivotal member in FIG. 1 in operation.
Figure 7:
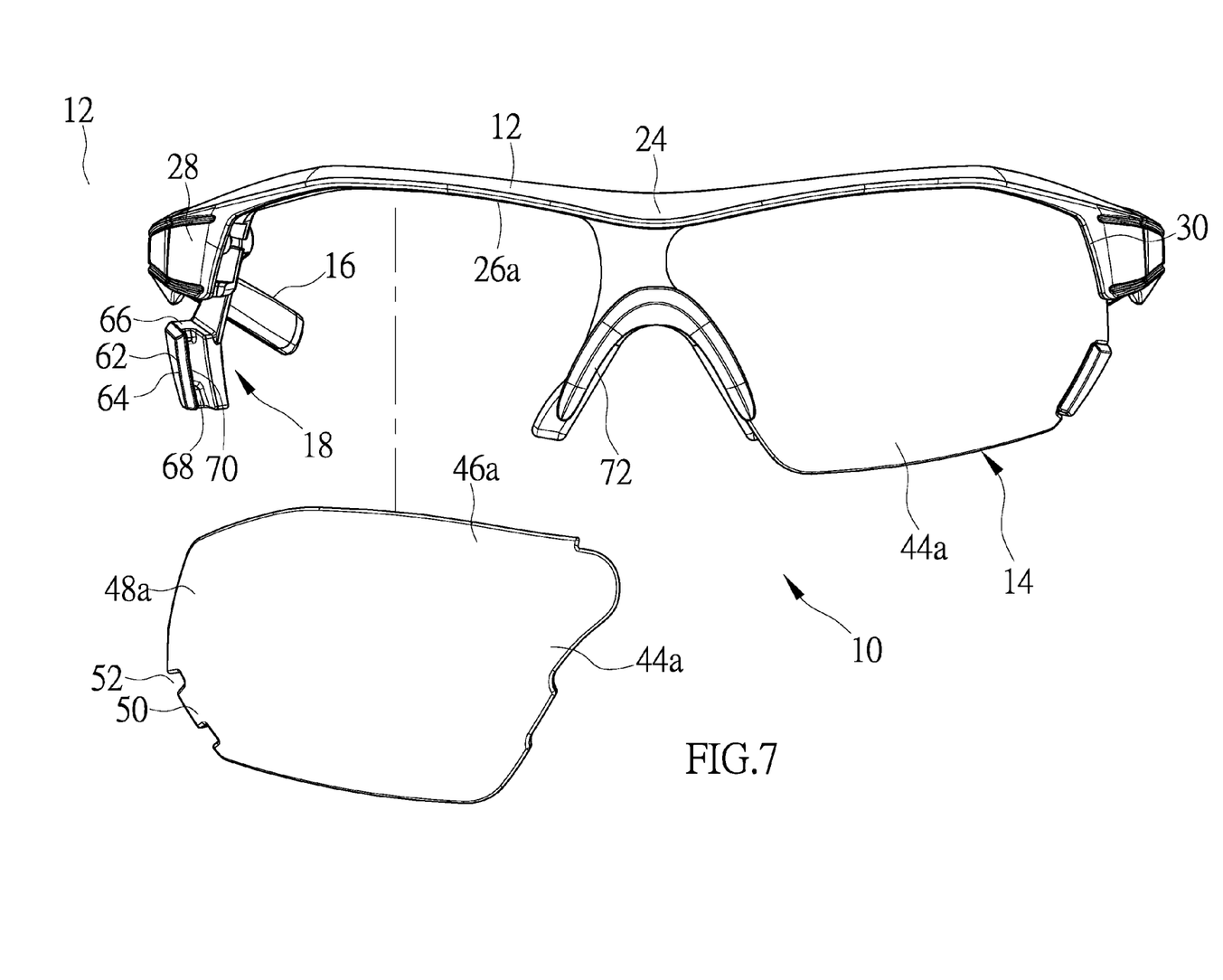
FIG. 7 is a schematic view which illustrates a pair of glasses in accordance with another embodiment of the present invention

FIG. 7 illustrates a pair of glasses 10 in another embodiment. In this embodiment, the lens unit 14 includes two separate lenses 44a, each of which covers a user's one eye. The spectacles frame 12 is provided with a nose pad portion 72 formed at the lower end of the central portion 24 and includes two lens support grooves 26a, each of which is developed between the internal end 30 of one of the mounting adapters 28 and the nose pad portion 72 along the bottom of the spectacles frame 12. Each of the lenses 44a has an outer border 48a and a top 46a which is held in and engages with a corresponding lens support groove 26a of the spectacles frame 12. A snap-fit portion 50 is designed at a lower portion of the outer border 48a and defined between two spaced notches 52. When the lens unit 14 is assembled and fixed on the spectacles frame 12, the snap-fit portions 50 of the lenses 44a are respectively inserted in and engage with the locating slots 70 of the engaging bodies 62 of the pivotal members 18. When the pivotal members 18 are moved outward, the engaging bodies 62 of the pivotal members 18 are separated from the snap-fit portions 50 of the lenses 44a, and the lens unit 14 can be disassembled from the spectacles frame 12.

Thus since the invention disclosed herein may be embodied in other specific forms without departing from the spirit or general characteristics thereof, some of which forms have been indicated, this embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A pair of glasses comprising:
   a spectacles frame including a first end, a second end, and a central portion between the first and second ends, with a mounting adapter formed at each of the first and second ends and including a pivot hole;
   a lens unit detachably assembled on the spectacles frame and including two snap-fit portions; and
   two pivotal members each including a swing arm, with a pivot provided at an upper end of the swing arm and held in the pivot hole of a corresponding mounting adapter to define an axis by which each of the pivotal members can make a pivotal rotation relative to the spectacles frame, with an engaging body formed at a lower end of the swing arm and including a locating slot,
   wherein the lens unit is fixed on the spectacles frame when the two snap-fit portions of the lens unit are engaged with the two locating slots of the two pivotal members, wherein the lens unit can be disassembled from the spectacles frame when the two snap-fit portions of the lens unit are separated from the two locating slots of the two pivotal members.

2. The pair of glasses according to claim 1, wherein the lens unit includes a lens having a top and two lateral outer borders, with the pivot hole being near an internal end of the mounting adapter, with each of the two outer borders partially held in the internal end of the mounting adapter, with each of the two snap-fit portions designed at a lower portion of one of the two outer borders of the lens.

3. The pair of glasses according to claim 2, wherein two notches are opened in the lower portion of each outer border of the lens and indent from an edge of the outer border to define the snap-fit portion between the two notches.

4. The pair of glasses according to claim 3, wherein the engaging body includes two spaced chuck walls, an upper interconnecting portion bridging upper ends of the two chuck walls, and a lower interconnecting portion bridging lower ends of the two chuck walls, with the locating slot defined between the two chuck walls, with the upper and lower interconnecting portions of each pivotal member held in the two notches of the lens, respectively.

5. The pair of glasses according to claim 1, wherein the mounting adapter is formed at a lower end of each of the first and second ends of the spectacles frame, with a slot formed in the internal end of each mounting adapter and in communication with a corresponding pivot hole, with the pivot held in the pivot hole of the corresponding mounting adapter through the slot.

6. The pair of glasses according to claim 1, wherein a caulking groove is prepared in an upper end of the top of the lens and joins a lower end of the central portion of the spectacles frame on which the lens unit is assembled.

7. The pair of glasses according to claim 1, wherein the lens unit includes two lenses, with the spectacles frame provided with a nose pad portion formed at a lower end of the central portion and including two lens support grooves, with each of the two lens support grooves developed between the internal end of one of the mounting adapters and the nose pad portion along a bottom of the spectacles frame, with each of the two lenses having an outer border and a top held in and engaged with a corresponding lens support groove of the spectacles frame, with the two snap-fit portions respectively designed at a lower portion of the outer border of the two lenses.

8. The pair of glasses according to claim 7, wherein two spaced notches are opened in the lower portion of the outer border of each lens and indent from an edge of the outer border to define the snap-fit portion between the two notches.

9. The pair of glasses according to claim 8, wherein the engaging body includes two spaced chuck walls, an upper interconnecting portion bridging upper ends of the two chuck walls, and a lower interconnecting portion bridging lower ends of the two chuck walls, with the locating slot defined between the two chuck walls, with the upper and lower interconnecting portions of each pivotal member held in the two notches of a corresponding lens, respectively.

\* \* \* \* \*